DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 20, 1971

888 O.G. 708

T888,017
COATING OF SILVER HALIDE DOTWISE

Edward C. Yackel and Donald P. Foster, both of
1669 Lake Ave., Rochester, N.Y. 14615

Filed Dec. 10, 1970, Ser. No. 97,020
**Int. Cl. G03c *1/02***
U.S. Cl. 96—94
No Drawing. 18 Pages Specification

The coating of a silver halide emulsion dotwise is accomplished by gravure or letterpress printing procedures by using a novel emulsion composition comprising certain gelatin "anti-bonding" agents such as, for example, ethyl carbamate, acetamide, urea, ethyl carbonate, sulfamide, methyl sulfamide, formamide or semicarbazide. Also useful, but somewhat less effective, are n-butyl carbamate, dimethyl sulfone and succinimide. The most suitable compositions for dotwise printing are silver halide emulsions of low gelatin content to which an anti-bonding agent is added, containing, for example, at least 1 weight percent silver halide, at least 25 weight percent water, 1 to 10 weight percent gelatin and at least 3 weight percent of an antibonding agent of the type indicated. The viscosity range for the emulsions should be from 1/16 to 3 poise for gravure printing and from 5 to 500 poise for letterpress printing.